US008402428B2

(12) United States Patent
Alex (10) Patent No.: US 8,402,428 B2
(45) Date of Patent: Mar. 19, 2013

(54) METHOD AND APPARATUS FOR AUTOMATICALLY GENERATING SOURCE CODE FILES IN A FILE STORAGE UNIT

(75) Inventor: Benjamin Peter Alex, Chatswood (AU)

(73) Assignee: VMware, Inc., Palo Alto, CA (US)

(*) Notice: Subject to any disclaimer, the term of this patent is extended or adjusted under 35 U.S.C. 154(b) by 562 days.

(21) Appl. No.: 12/721,790

(22) Filed: Mar. 11, 2010

(65) Prior Publication Data

US 2010/0275180 A1 Oct. 28, 2010

(30) Foreign Application Priority Data

Apr. 27, 2009 (GB) .................................. 0907171.3

(51) Int. Cl.
G06F 9/44 (2006.01)
(52) U.S. Cl. ....................................................... 717/106
(58) Field of Classification Search ................... 717/106
See application file for complete search history.

(56) References Cited

U.S. PATENT DOCUMENTS

| | | | | |
|---|---|---|---|---|
| 4,558,413 A * | 12/1985 | Schmidt et al. | ............... | 717/170 |
| 2005/0262482 A1 | 11/2005 | Wagner et al. | | |
| 2007/0226681 A1* | 9/2007 | Thorup | ......................... | 717/104 |
| 2008/0250325 A1* | 10/2008 | Feigenbaum et al. | ........ | 715/744 |
| 2009/0100405 A1* | 4/2009 | Belenky et al. | ............... | 717/104 |
| 2009/0265717 A1* | 10/2009 | Tang | ............................ | 719/313 |
| 2010/0275180 A1* | 10/2010 | Alex | ............................. | 717/106 |

OTHER PUBLICATIONS

Extended European Search Report, Sep. 23, 2010, European Patent Office, pp. 2-6.
Anonymous, "Makedepend," Wikipedia XP002598733, Aug. 21, 2008, pp. 1-2. Retrieved from the Internet: URL: http:///en.wikipedia.org/w/index.php?title=Makedepend&oldid=233381794. Retrieved on Aug. 30, 2010. *the whole document*.
United Kingdom Patent Application No. 0907171.3, filed Apr. 27, 2009, entitled "Method and Apparatus for Automatically Generating Source Code Files in a Storage Unit."
Electronic Filing Receipt, United Kingdom Patent Application No. 0907171.3, filed Apr. 27, 2009, "Method and Apparatus for Automatically Generating Source Code Files in a Storage Unit."

* cited by examiner

Primary Examiner — Philip Wang (57) ABSTRACT

An apparatus for automatically generating source code files in a file storage unit is disclosed. The apparatus includes a file storage unit that stores the source code files, a code generator unit that generates at least some of the source code files, wherein the code generator unit comprises, and a file unit that monitors the file storage unit to detect changes in the file storage unit and in response send file event notifications. A metadata unit that builds a metadata model relating to the source code files in the file storage unit is also provided. The metadata model comprises a plurality of metadata items, each metadata item comprises a metadata section containing metadata, a key that identifies the metadata item, and one or more dependencies of the metadata items in relation to other of the metadata items. The metadata unit sends metadata notifications according to changes to the dependencies of the metadata items. The apparatus further includes at least one add-on unit comprising a metadata provider module that provides the metadata items to the metadata unit and registers the dependencies of the metadata items on other of the metadata items.

18 Claims, 8 Drawing Sheets

```
                                                                    ┌─ 323
         ┌──────────────────────────────────────────────────────────────────┐
         │ Identifier :MID:org.codegenerator.classpath.PhysicalTypeIdentifier#SRC_MAIN_JAVA?com.foo.Author
   327 ──┤
         │ Upstream :
         │
         │ Downstream : MID:org.codegenerator.addon.tostring.ToStringMetadata#SRC_MAIN_JAVA?com.foo.Author
   328 ──┤ Downstream : MID:org.codegenerator.addon.beaninfo.BeanInfoMetadata#SRC_MAIN_JAVA?com.foo.Author
         │ Downstream : MID:org.codegenerator.addon.entity.EntityMetadata#SRC_MAIN_JAVA?com.foo.Author
         │ Downstream : MID:org.codegenerator.addon.finder.FinderMetadata#SRC_MAIN_JAVA?com.foo.Author
         │ Downstream : MID:org.codegenerator.addon.plural.PluralMetadata#SRC_MAIN_JAVA?com.foo.Author
         │ Downstream : MID:org.codegenerator.addon.configurable.ConfigurableMetadata#SRC_MAIN_JAVA?com.foo.Author
         │ Downstream : MID:org.codegenerator.addon.javabean.JavaBeanMetadata#SRC_MAIN_JAVA?com.foo.Author
         │
         │
         │ Metadata :
   329 ──┤ [JavaParserClassMetadata@59a735 identifier =
         │ 'MID:org.codegenerator.classpath.PhysicalTypeIdentifier#SRC_MAIN_JAVA?com.foo.Author', valid = true,
         │ fileIdentifier = '/home/src/main/java/com/foo/Author.java', physicalTypeDetails =
         │ [JavaParserMutableClassOrInterfaceTypeDetails@a37c6a name = com.foo.Author, modifier = 'public',
         │ physicalTypeCategory = CLASS, declaredByMetadataId =
         │ 'MID:org.codegenerator.classpath.PhysicalTypeIdentifier#SRC_MAIN_JAVA?com.foo.Author', declaredConstructors =
         │ list[[empty]], declaredFields = list[[JavaParserFieldMetadata@13d21d6 declaredByMetadataId =
         │ 'MID:org.codegenerator.classpath.PhysicalTypeIdentifier#SRC_MAIN_JAVA?com.foo.Author', modifier = 'private',
         │ fieldType = java.lang.String, fieldName = firstName, fieldInitializer = [null], annotations = list[[empty]]],
         │ [JavaParserFieldMetadata@7881db declaredByMetadataId =
         │ 'MID:org.codegenerator.classpath.PhysicalTypeIdentifier#SRC_MAIN_JAVA?com.foo.Author', modifier = 'private',
         │ fieldType = java.lang.String, fieldName = lastName, fieldInitializer = [null], annotations = list[[empty]]]],
         │ declaredMethods = list[[empty]], superclass = [null], extendsTypes = list[[empty]], implementsTypes = list[[empty]],
         │ typeAnnotations = list[[JavaParserAnnotationMetadata@1956391 annotationType =
         │ org.codegenerator.addon.javabean.CGJavaBean, attributes = list[[empty]]], [JavaParserAnnotationMetadata@bbf7aa
         │ annotationType = org.codegenerator.addon.tostring.CGToString, attributes = list[[empty]]],
         │ [JavaParserAnnotationMetadata@80ed90 annotationType = org.codegenerator.addon.entity.CGEntity, attributes =
         │ list[finders -> {__ARRAY_ELEMENT__ -> findAuthorsByLastNameOrFirstNameLike}]]]]]
         │
         └──────────────────────────────────────────────────────────────────┘
```

METHOD AND APPARATUS FOR AUTOMATICALLY GENERATING SOURCE CODE FILES IN A FILE STORAGE UNIT

DESCRIPTION OF RELATED APPLICATION(S)

This application claims the benefit of UK Patent Application No. 0907171.3 filed on Apr. 27, 2009.

BACKGROUND

Description of Related Art

Modern computing systems are highly sophisticated and complex machines, which are relied upon to perform a huge range of tasks in all our everyday lives. These computer systems comprise a large number of individual components and sub-systems that must all work together correctly. Hence, it is a difficult challenge to build fully-working programs for these computer systems and a large amount of time and expense is involved in creating, modifying and maintaining the computer systems.

It is known to provide a computer system with a code generator unit that automatically generates source code files, such as by using predetermined templates. These code generators reduce some of the need for laboriously handwritten source code, but the computer system still requires significant effort by a skilled programmer. In particular, the code generators in the related art are useful only when the computer system creates a new computer program, or else require the computer system to have an ongoing dependency on the code generator.

Figure 1:
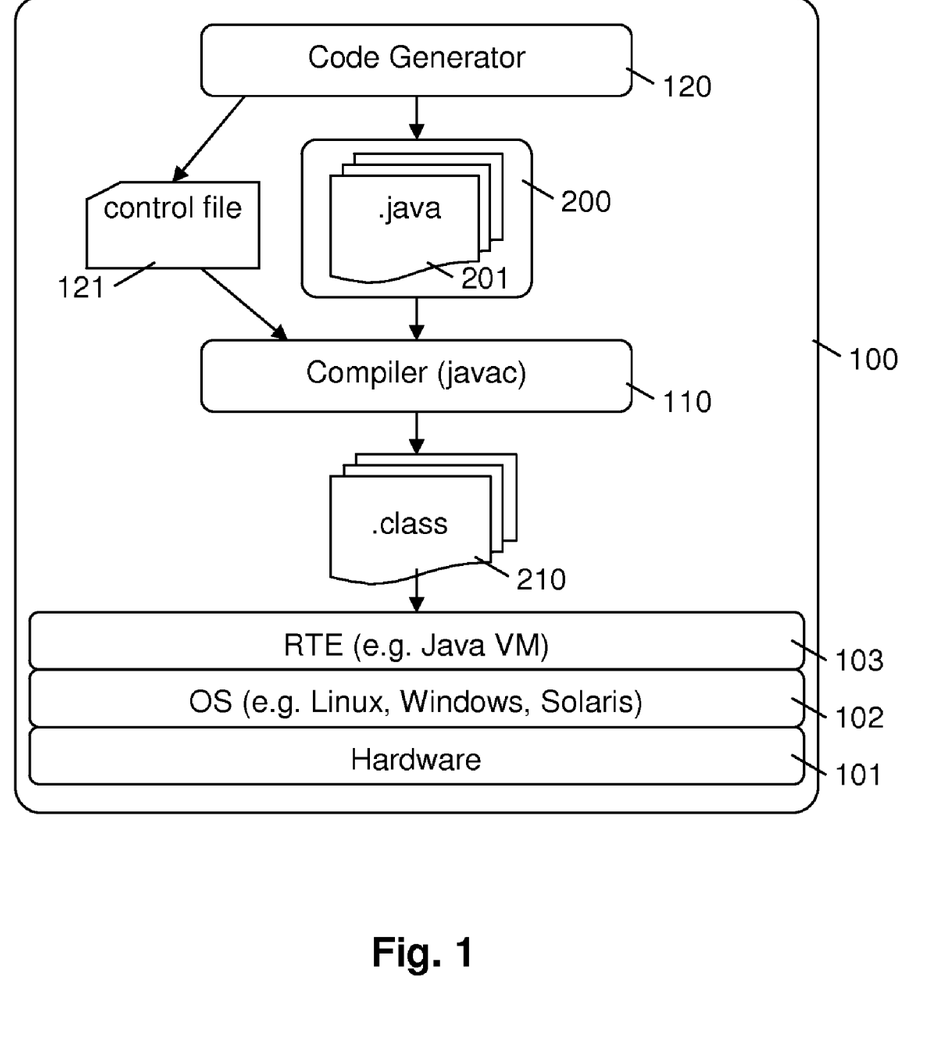
FIG. 1 is a schematic overview of a computer system of the related art.

FIG. 1 is a schematic overview of an example computer system 100 of the related art, which includes a code generator 120. In this example, the computer system 100 includes physical hardware (HW) 101 such as memory, processors, I/O interfaces, backplane, power supply and so on as are found in, for example, a typical workstation computer; an operating system (OS) 102 such as Windows, Linux or Solaris; and a runtime environment (RTE) 103 which may include a virtual machine, as will be familiar to those skilled in the art.

Generally, a computer program 200 is created by first writing source code files 201 in a high-level programming language (e.g. Java or C++) that is easily understood by a human programmer. Traditionally, the source code is created by hand in one or more textual source code files and a typical computer program 200 may contain thousands of lines of code. A compiler 110 then compiles the source code files 201 into compiled code 210 in a lower-level machine-oriented language, such as Java bytecode or machine code, which is not intended for human editing. Typically, the runtime environment 103 then executes the compiled code 210 on the host hardware 101 supported by the operating system 102.

In the example of FIG. 1, the source code 201 is written in Java and is stored on the computer system 100 in text files, by convention with a .java extension. The compiler 110, such as the popular compiler javac, then produces the compiled bytecode files 210, which by convention have a .class extension.

As one example, the code generator 120 is based on a user interface (UI), such as a textual command line (shell) that receives user commands based on keystrokes on a keyboard. As another example, the code generator is coupled to a graphical user interface (GUI) such as the popular Eclipse IDE (Integrated Development Environment).

In response to the user commands, these template-based code generators automatically emit one or more source code files 201 containing sections of code based on standard templates (e.g. .java source code files 201 containing frequently-needed 'boilerplate' code). This automatically generated code is then modified and maintained by hand according to the needs of the program. Usually, this type of code generator 120 does not support 'round-tripping', in that the user-modified source code cannot be passed back to the code generator 120 for further code generation.

This type of code generator generally produces relatively few, but lengthy, source code files 201, which the programmer is then expected to modify and maintain by hand without further dependency on the code generator 120. Such template-based code generators 120 are relatively popular, but the computer system 100 is still costly and inefficient. In particular, the code generator 120 only assists when creating the program 200. However, a major proportion of the lifetime engineering expense of a computer system usually relates to maintaining and modifying the programs, rather than the initial creation of the programs.

As another example, the code generator 120 is arranged to examine the source code files 201 produced by the programmer and automatically generate additional code at build time, i.e. when the program is compiled. For example, the code generator 120 detects tags in the source code files 201 and in response automatically emits a code generation control file 121 (e.g. based on a markup language such as XML). For example, the XDoclet code generator system detects and responds to special @ tags which are inserted by the programmer into the Java source code files 201, as a special form of JavaDoc comments. Round-tripping is supported in that the code generator 120 will, at the next run, respond to any new tags that have been manually introduced by the programmer in the user-generated source code files 201. However, this type of build-time code generator produces files that are not intended to be edited by the human programmer, and the generated files 121 will be overwritten the next time the code generator is run. Thus, the computer system 100 usually remains dependent upon the code generator 120 for future maintenance and modifications of the computer program 200, and the code generator 120 needs to be maintained as part of a build system. Further, the internal control files 121 used by the code generator 120 are not easily stored together with the user-generated source code files 201, and so are not captured by formal version control systems. Also, this type of code generator 120 tends to be more complex to install and maintain. As a result, these build-time code generators have not been widely adopted in practice, and/or have been restricted to specific functionality, such as grammar build-time generators.

SUMMARY

The example embodiments described herein provide a code generator that (a) emits inter-type declarations as one of its generation artefacts and (b) uses a metadata infrastructure to determine an initial content of the inter-type declarations and subsequent modifications to the inter-type declarations.

The example code generator generates a metadata model that is held in a memory of a computer system, while the code generator examines and modifies one or more source code files held by a file storage unit. The code generator uses the metadata model to output the inter-type declarations and modify a content of the inter-type declarations.

At least some of the example embodiments may be constructed, partially or wholly, using dedicated special-purpose hardware. Terms such as 'component', 'module' or 'unit' used herein may include, but are not limited to, a hardware device, such as a Field Programmable Gate Array (FPGA) or Application Specific Integrated Circuit (ASIC), which performs certain tasks. Also, elements of the example embodiments may be configured to reside on an addressable storage medium and be configured to execute on one or more processors. That is, some of the example embodiments may be implemented in the form of a computer-readable storage medium having recorded thereon instructions that are, in use, executed by a computer system. The medium may take any suitable form, but examples include solid-state memory devices (ROM, RAM, EPROM, EEPROM, etc.), optical discs (e.g. Compact Discs, DVDs, Blu-Ray discs and others), magnetic discs, magnetic tapes and magneto-optic storage devices. In some cases the medium is distributed over a plurality of separate computing devices that are coupled by a suitable communications network, such as a wired network or wireless network. Thus, functional elements of the invention may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Further, although the example embodiments have been described with reference to the components, modules and units discussed below, such functional elements may be combined into fewer elements or separated into additional elements.

BRIEF DESCRIPTION OF THE DRAWINGS

FIG. 5 is an example of a metadata item;

DETAILED DESCRIPTION

The example embodiments of the present invention will be discussed in detail particularly in relation to Java and the AspectJ extension of Java. However, the teachings, principles and techniques of the present invention are also applicable in many other specific embodiments. For example, embodiments of the present invention are also applicable to other aspect-oriented programming environments, virtual machine environments and other middleware platforms, which will also benefit from the teachings herein.

Figure 2:
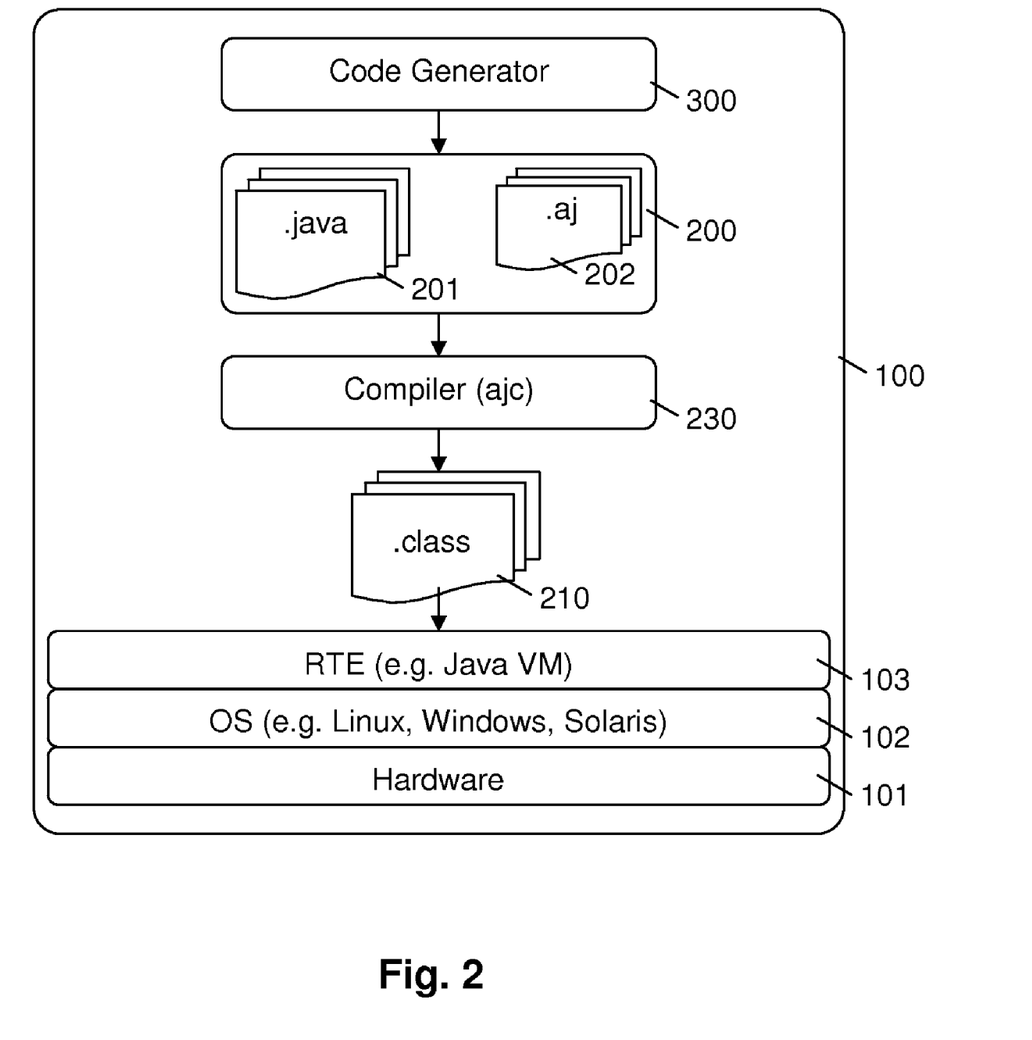
FIG. 2 is a schematic overview of a computer system in which example embodiments of the present invention are applied.

FIG. 2 is a schematic overview of a computer system 100 in which the example embodiments of present invention are applied. The computer system 100 includes a hardware layer 101, an operating system layer 102 and a runtime environment 103. The computer system 100 also has a compiler 230 and a code generator 300.

In the example embodiments, the code generator 300 is arranged to assist the generation of a new computer program 200 (usually termed a project), by automatically generating one or more of the source code files 201, 202. The compiler 230 then compiles the project 200 based on the source code files 201, 202.

In these example embodiments, the compiler 230 supports Aspect Oriented Programming (AOP), such as using the AspectJ extension for Java. For example, the compiler 230 is suitably based on the ajc compiler. In this case, the compiler 230 refers to aspect-oriented source code files 202, which by convention have a .aj file extension. The .aj files are text files provided alongside the .java object-oriented source code files 201. The .aj files 202 instruct the compiler 230 during compilation to automatically modify the components or behaviour of program as expressed in the .java files 201, i.e. by modifying members that are created by the programmer in the .java files 201 with cross-cutting concerns which are specified in the .aj files 202.

The aspect oriented source code files 202 allow certain features (concerns), such as security and logging, to be provided separately from the main functional areas of the computer program, because these concerns affect (cut across) many different parts of the computer program. Hence, a computer system 100 that supports aspect oriented programming achieves greater productivity by allowing these cross-cutting concerns, such as security, to be modularised separately and then later applied throughout the source code 201 of the program 200.

In object oriented programming, a .java source code file usually comprises many members, including methods, constructors, fields, static initializers, inner classes and so on. A type is a logical container that holds the members and usually there is one type per .java source code file. Therefore, there is usually one type per compiled .class file. A type is most often a class or an interface. As a simple example, a HelloWorld.java source code file 201 for a "HelloWorld" program includes members such as:

| Method | "sayHello( )" |
| Field | "String name" |
| Constructor | "HelloWorld(String)" |

Traditionally, concerns such as security are applied to numerous types in the system when the source code is originally written. As a simple example, the "HelloWorld" program includes a security check, in which case the method might look like:

```
public void sayHello( ) {
    doSecuritycheck( );
    System.out.println("Hello, " + this.name);
}
```

However, writing doSecurityCheck( ) within every single method in the system is repetitive, tedious and error-prone. To solve this, AOP techniques allow the security-related logic to be put into its own separate aspect-oriented source code file 202, e.g. Security.aj. The ajc compiler 230 reads the separate Security.aj file and automatically adds its behaviour to the compiled HelloWorld.class. Now, the object-oriented source code file 201 HelloWorld.java has no security references. Instead, the ajc compiler 230 creates a HelloWorld.class with security due to the aspect in the Security.aj aspect-oriented source code file 202. In this simple example, ajc adds the "doSecurityCheck( )" behaviour into every method within the HelloWorld.class bytecode file 210. The security check does not need to be repeatedly included by hand, and the .java source code file 201 is simplified, which increases productivity and decreases maintenance costs.

The computer system 100 of the example embodiments also supports inter-type declarations (also termed introductions or mix-ins). Normally, as discussed above, AOP techniques apply cross-cutting concerns, such as the doSecurityCheck( ) behaviour, to existing members in the relevant .java source code files 201. By contrast, an inter-type declaration (ITD) creates new, additional, members in the respective compiled .class file 210. The code in the .aj file 202 defines the type where the member is to be introduced. That is, the .java source code file 201 does not define the member, yet the member is inserted by the compiler 230 during compilation and the member thus appears in the compiled code of the corresponding .class file 210. For example, the Security.aj file 202 introduces a "getUsername( )" method into the HelloWorld.class file 210 by using an ITD. Here, the getUsername( )method returns a username for a current user account on the computer system 100.

In themselves, ITDs are known to those skilled in the art and have been used mainly to augment aspect-oriented programming. However, as will be explained in more detail below, the example embodiments of the code generator 300 use ITDs to achieve additional functionality and solve technical problems in relation to a code generator in a computer system. In particular, the code generator 300 emits source code in the form of the aspect-oriented source code files (e.g. .aj files) 202. Further, these files 202 include ITDs as code generating artifacts. That is, the code generator uses ITDs to emit compilation units.

Figure 3:
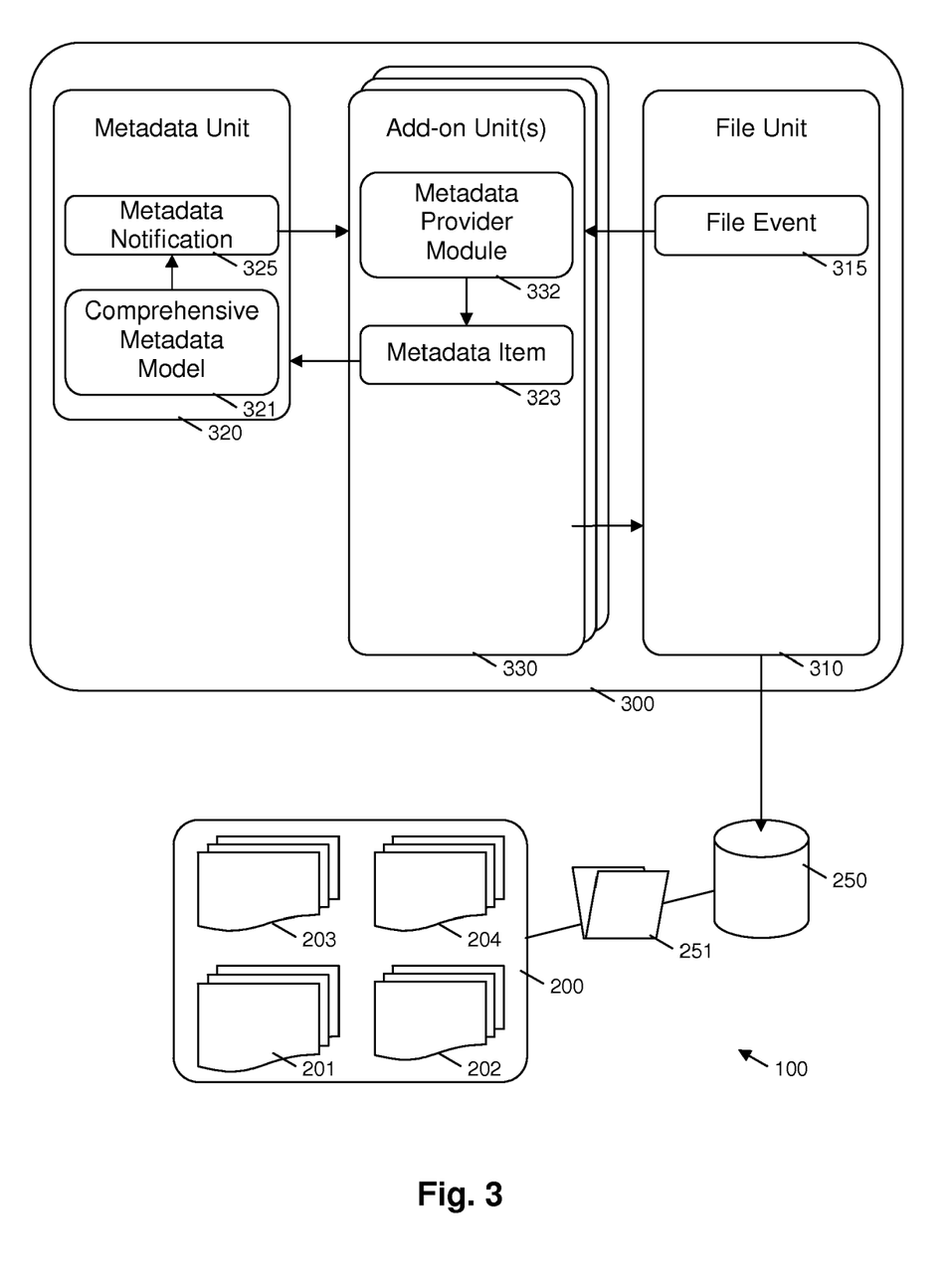
FIG. 3 is a schematic view of an example code generator.

FIG. 3 is a schematic view of the computer system 100, showing some of the units and modules of the code generator unit 300. Here, the code generator 300 includes a file unit 310, a metadata unit 320, and at least one add-on unit 330. Also, a file storage unit 250 has a directory 251 and stores one or more source code files 201-204 of a project 200.

In this example, the source code files 201-204 may include one or more object-oriented files 201 (e.g. JAVA files) and one or more aspect-oriented files 202 (e.g. AspectJ files). Also, the source code files may include other user-editable files, such as project management files or scripting files 203, 204 (e.g. XML or JSP files). Thus, each project 200 typically comprises a plurality of individual source code files 201-204 with differing types or formats.

The file unit 310 performs inspections of the file storage unit 250, and detects changes that have been made to the file storage unit 250 in relation to the project 200. Conveniently, the file unit 310 is arranged to monitor the directory 251 which contains the project 200 (and optionally sub-directories therein). The file unit 310 may monitor one or more properties associated with the monitored directory 251 and/or in relation to the files which are 201-204 stored in the directory 251, such a timestamp that indicates a time when this file system was last modified. The file unit 310 detects that a change has occurred such as by comparing the timestamp in a current inspection to the timestamp in a previous inspection (i.e. by recording the timestamps at each inspection for comparison with the next inspection). Also, the file unit 310 may register with facilities of the operating system 102 to be notified of disk changes. In response, the file unit 310 issues notifications (i.e. file event notifications 315) that inform the other units in the code generator 300 that a change in the file storage unit 250 has been detected.

The metadata unit 320 gathers a comprehensive metadata model 321 of the project 200 comprising a plurality of metadata items 323 that relate to elements within the project 200.

The metadata unit 320 then sends metadata notifications 325 in response to changes within the metadata model 321. Here, the metadata notification messages 325 are directed according to dependencies of the metadata items 323 in the metadata model 321.

The example embodiments provide a plurality of the add-on units 330 each having different functions and responsibilities. Typically, each add-on unit 330 is responsible for particular kinds of source code files. For example, a persistence add-on deals with source code files that relate to persistence, such as the Java Persistence API which manages relational data in Java programs. A project add-on deals with source code files for project management, such as a project object model (e.g. pom.xml). Conveniently, this architecture of the code generator 300 is flexible and allows many different add-on units 330 to be built, customised and shared over time.

As shown in FIG. 3, each add-on unit 330 includes a metadata provider module 332. The metadata provider module 332 provides the metadata items 323 for use in the metadata model 321. Also, the metadata provider module 332 registers dependencies of the metadata items 323 upon other metadata items 323 in the metadata model 321.

The metadata provider module 332 also receives the metadata notifications 325 issued by metadata unit 320. In response to those notifications 325, the metadata provider module 332 reassess the affected metadata items 323. This reassessment of metadata item 323 determines whether the source code files 201-204 remain correct or require creation, modification or deletion, in which case the relevant source code files 201-204 are created, modified or deleted via the file unit 310.

In use, the code generator 300 is capable of initiating changes to the source code files 201-204 in the file storage unit 250 in any of three different ways. Firstly, the changes are initiated by the file monitoring performed by the file unit 310. Secondly, the changes are initiated by the metadata model held by the metadata unit 320. Thirdly, the changes may be initiated by user commands, such as through a user interface unit, as will be discussed later.

The code generator 300 actively manages the source code files 201-204 in the file storage unit 250 and responds to changes initiated both from within the code generator 300 and from outside of the code generator 300 (e.g. the file monitoring detects that a .java file in the file storage unit 250 has been amended, such as through a separate IDE). At a later stage, the code generator 300 ceases to monitor the file storage unit 250, leaving the source code files 201-204 in the file storage unit 250 ready for subsequent processing, without any further dependency on the code generator 300. For example, the source code files 201-204 are compiled by the ajc compiler 230 of FIG. 2 without any reference to the code generator 300. That is, the code generator 300 is a development tool that allows the computer system 100 to be more efficient in creating the source code files, and in subsequently modifying and maintaining those source code files over time. However, the example code generator 300 does not need to be present as part of the build system that builds the compiled files, and does not need to be present in a runtime system that executes the compiled files.

Figure 4:
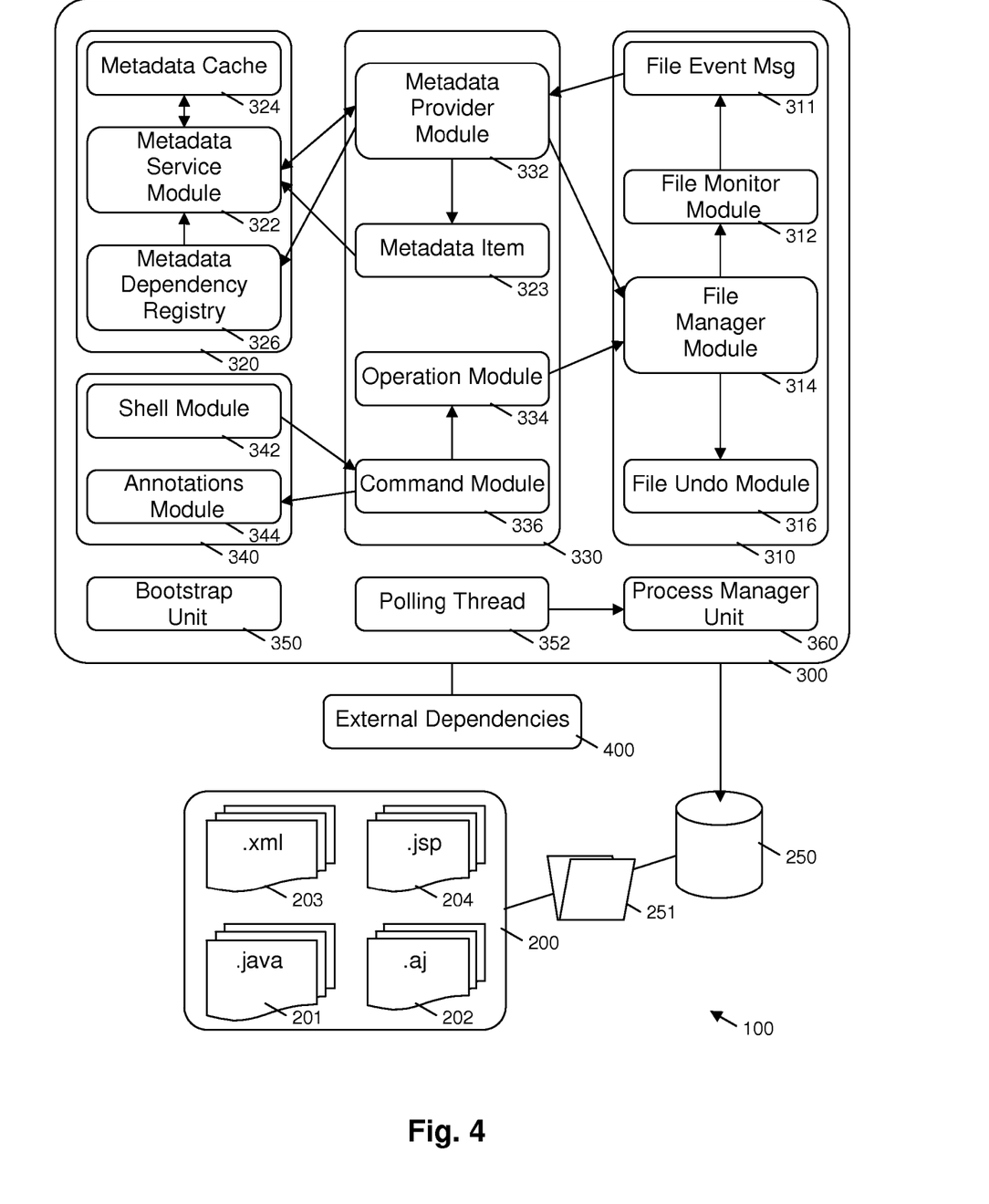
FIG. 4 is a schematic view of units and modules within the code generator.

FIG. 4 is a schematic diagram showing the individual units and modules within the code generator 300 and their relationships in more detail. Here, the code generator 300 also includes an interface unit 340, a bootstrap unit 350, a polling thread 352 and a process manager 360.

For completeness, the code generator 300 is illustrated with external dependencies, such as upon a Spring Framework 400. The Spring Framework 400 provides support for bootstrap functions that are used by the code generator 300. As an example, Spring Framework 400 is used to perform dependency injection of individual components used within code generator 300 (as discussed further below and illustrated in FIG. 6). Spring Framework itself requires a number of external dependencies such as SLF4J (Simple Logging Facade for Java). However, these and other external dependencies will, in themselves, be familiar to those skilled in the art and, for simplicity and clarity, will not be discussed further herein.

As shown in FIG. 4, the file unit 310 includes a file monitor module 312, a file manager module 314, and a file undo module 316.

The file monitor module 312 performs inspections of the file storage unit 250. Simple implementations of the file monitor module 312 may rely on file system "last modification" timestamps provided by the operating system 102 to detect changes in combination with a periodic polling mechanism. However, the relatively coarse granularity of detection (100-1000 milliseconds) found in most modern file systems may fail to detect a rapid series of disk modifications as are routinely processed by the example code generator 300. Such limitations are addressed by the file monitor module 312 registering with specific file system notification APIs in the operating system 102 or alternately by requiring that file modifications made by the code generator 300 are explicitly notified to the file monitor module 312, such as by way of the file manager module 314 performing a callback. Thus, the file monitor module 312 issues the file event notifications 315 in response to the detected changes to the monitored source code files 201-204 and the directory (or directories) 251.

The file manager module 314 controls the changes to the file storage unit 250 that are made by the code generator 300. The file manager module 314 provides a file management interface that receives and processes input and output requests, such that changes to the file storage unit 250 made by the add-on units 330 pass through the file manager module 314. The file manager module 314 records each of the changes with the file undo module 316. Also, as noted above, the file manager module 314 suitably notifies the file monitor module 312 of these changes.

The file undo module 316 provides an undo management function that provides the ability to reverse changes made to the files on the storage unit 250, should one of the changes cause an error or exception. Thus, the code generator 300 is able to undo the changes that have been made to the file storage unit 250 if an error arises. In one example, the file undo module 316 rolls back the source code files 201-204 to their condition at a previous inspection. Therefore, the code generator 300 protects the file storage unit 250 from erroneous behaviour of the add-on units 330 or unexpected conditions. This simplifies development of the add-on units 330 and also enhances the ability to troubleshoot errors in their implementation.

The interface unit 340 provides an interface from the code generator 300 to other parts of the computer system 100. The interface unit 340 is conveniently configured as a user interface unit that receives and processes user commands received via a user interface (such as a screen, keyboard and mouse). In another example, the user interface unit 340 comprises a Graphical User Interface Module (not shown). For example, this GUI-Module is based on the SpringSource Tool Suite, which in turn is based on the Eclipse IDE.

As one example, the user interface unit 340 includes a shell module 342 and an annotations module 344. The shell module 342 is arranged to receive and parse user commands in a textual format. The shell module 342 may depend on an external command line interface, such as JLine, for assistance with integrating console input. In one embodiment, the shell module 342 cooperates with a command module 336 within each of the add-on units 330. The command module 336 suitably provides command definitions that define a list of commands, their syntax and options, relevant to this add-on unit 340.

The annotations module 344 defines the commands that are available in the user interface unit 340, their syntax and options. Suitably, one or more command definitions are provided from the command module 336 in each of the add-on units 330, and all of the available commands are collated by the annotations module 344 in the user interface 340.

As shown in FIG. 4, each of the add-on units 330 also includes an operation module 334 and a command module 336.

The operation module 334 provides services to the command module 336 and therefore is normally invoked in response to actions initiated through the user interface unit 340. The operation module 334 creates, updates or deletes one or more of the source code files 201-204 with reference to the metadata model 321 in response to the user commands. Most implementations of the operation module 334 modify the Java source files 201 to introduce one or more annotations which are specific to the code generator 300. As noted above, this modification of the source code files 201-204 results in one or more file event notifications 315 and the consequential updating of the metadata model 321. This update of the metadata model 321 will in turn trigger a succession of metadata notification messages 325 which update other source files 201-204 and in particular creates the aspect-oriented source code files (.aj files) 202.

In the illustrated example, the metadata unit 320 includes a metadata service module 322, a metadata cache module 324, and a metadata dependency registry module 326.

The metadata service module 322 gathers the metadata items 323 from the metadata provider modules 332 within each of the add-ons 330. For example, the metadata service module 322 issues a "get metadata item" request to the metadata provider module 332, and in response the metadata provider module 332 provides the requested metadata item 323.

The metadata cache 324 stores the metadata items 323 that have been gathered by the metadata service module 322. The cache 324 may have a finite size, such as by discarding the metadata items 323 that have been used least recently.

The metadata service module 322 also services metadata item requests made by the metadata provider modules 332 in the add-on units 330, by retrieving the requested metadata item 323 from the cache 324 or by getting the metadata item from the relevant metadata provider module 332 in one of the add-on units 330.

In this example, the metadata model 321 (see FIG. 3) held by the metadata unit 320 represents the state of Java source files 201 held by the storage unit 250. Here, abstract syntax tree (AST) parsing libraries can be used for producing such metadata. Abstract syntax tree processing libraries such as Java Parser or Eclipse Abstract Syntax Tree may be used for such purposes. Alternately, bytecode analysis of compiled classes 210 can be undertaken to produce the metadata model 321 and libraries such as ASM or BCEL are known for such analysis. The operation of abstract syntax tree and bytecode analysis frameworks is known to those familiar with the art and further discussion is omitted in the interests of clarity.

In the example embodiments, each metadata item 323 comprises a metadata section containing metadata, a key that identifies the metadata item, and zero or more dependencies of the metadata items in relation to other metadata items 323.

The metadata dependency registry 326 registers the dependencies between one metadata item 323 and another. These dependencies are generally determined by the metadata provider module 332 in the add-on units 330. The metadata provider module 332 will register specific dependencies with the metadata dependency registry 326. In the example embodiment, the metadata dependency registry 326 controls the dependencies to block a circular dependency.

The metadata items 323 are arranged in a hierarchical dependency tree or dependency chain. The metadata service module 324 sends the metadata notifications 325 only to the direct downstream dependents of an affected metadata item 323. That is, each metadata item 323 is notified of changes to any upstream metadata item 323 they have registered to receive notifications for. Items do not receive notifications relating to their downstream dependents.

In the embodiments, these dependencies are directional, and in one example are registered as being either an upstream dependency or a downstream dependency.

As an example, consider three items A, B and C, where C is dependent on B and B is dependent on A, and A is not dependent on any other metadata item. In this case C would have registered an upstream dependency on B. Similarly, B would have registered an upstream dependency on A. If we introspected the metadata dependency registry 326 we would see that A has no upstream dependencies listed, but A would have a downstream dependency listed due to the registration of B. When the metadata provider module 332 for A caused or detected that A should change, it would direct the metadata dependency registry 326 to notify the downstream dependencies of A. In this case B would be notified. If the metadata provider module 332 for B considered that the change in A would necessitate a change in B, it too would indicate to the metadata dependency registry 326 to notify the downstream dependencies of B that metadata item B had changed. In that case item C would be notified, and the process would repeat.

FIG. 5 shows one example metadata item 323 from the metadata model 321 in more detail, including the metadata key 327, the metadata dependencies 328, and the metadata field 329. Each of the metadata items 323 corresponds to an element within the source code files 201-204, and particularly to elements within the object-oriented source code files (e.g. JAVA files) 201.

In this example, the key 327 is held as a string for compactness and efficiency of processing in the computer system. The key 327 is formed from the label "MID:" (for Metadata IDentifier) and a fully qualified name field of the corresponding metadata item 323. In this example, the fully qualified name (FQN) is "org.codegenerator.classpath. PhysicalTypeIdentifier", which is the fully qualified Java name of the class which represents the metadata instance. Optionally, this key can be extended by a delimiter ("#") and an individual identifier field that identifies this specific instance of the metadata item 323. In this example, the individual identifier is "SRC_MAIN_JAVA?com.foo.Author". Generally such instance-specific identifiers refer to specific artefacts within project 200, as is illustrated in this SRC_MAIN_JAVA?com-foo.Author example. The key allows the metadata item 323 to be referenced and identified in the metadata notifications 325.

In this example, the dependencies 328 show that the item 323 has no upstream dependencies but does have several downstream dependencies. For example, there is a downstream dependency to another metadata item "MID: [ . . . ].beaninfo.BeanInfoMetadata#SRC_MAIN_JAVA? com.foo.Author".

The metadata section 329 contains the metadata for the relevant element, which in this case is converted into a string in the form shown. The example string representation given in FIG. 5 is not a complete internal representation of the metadata item 323, but merely a convenient manner to represent some of the more important constituent attributes for illustration.

In the example embodiment, each of the metadata notifications 325 comprises the key of the upstream item 323 which caused the notification, followed by the key of the downstream item 323 which, due to the dependency, is affected by the change to the upstream item. Thus, the notifications 325 are suitably of the form:

notify (MIDupstream, MIDdownstream): void

Similarly, the item request message may take the following form, which requests a return type as the full metadata item based on the specified item key:

get (MID):MetadataItem

It will be appreciated that this metadata infrastructure represents a higher level of detail than typically exposed by low-level type introspection metadata available through programming language mirror APIs, abstract syntax tree or bytecode analysis techniques. In other words, the metadata model uses the metadata keys and the metadata dependencies to provide additional functions in the code generator, including particularly the ability for round-tripping wherein the generated source code files are re-examined by the code generator and further modifications made.

Figure 6:
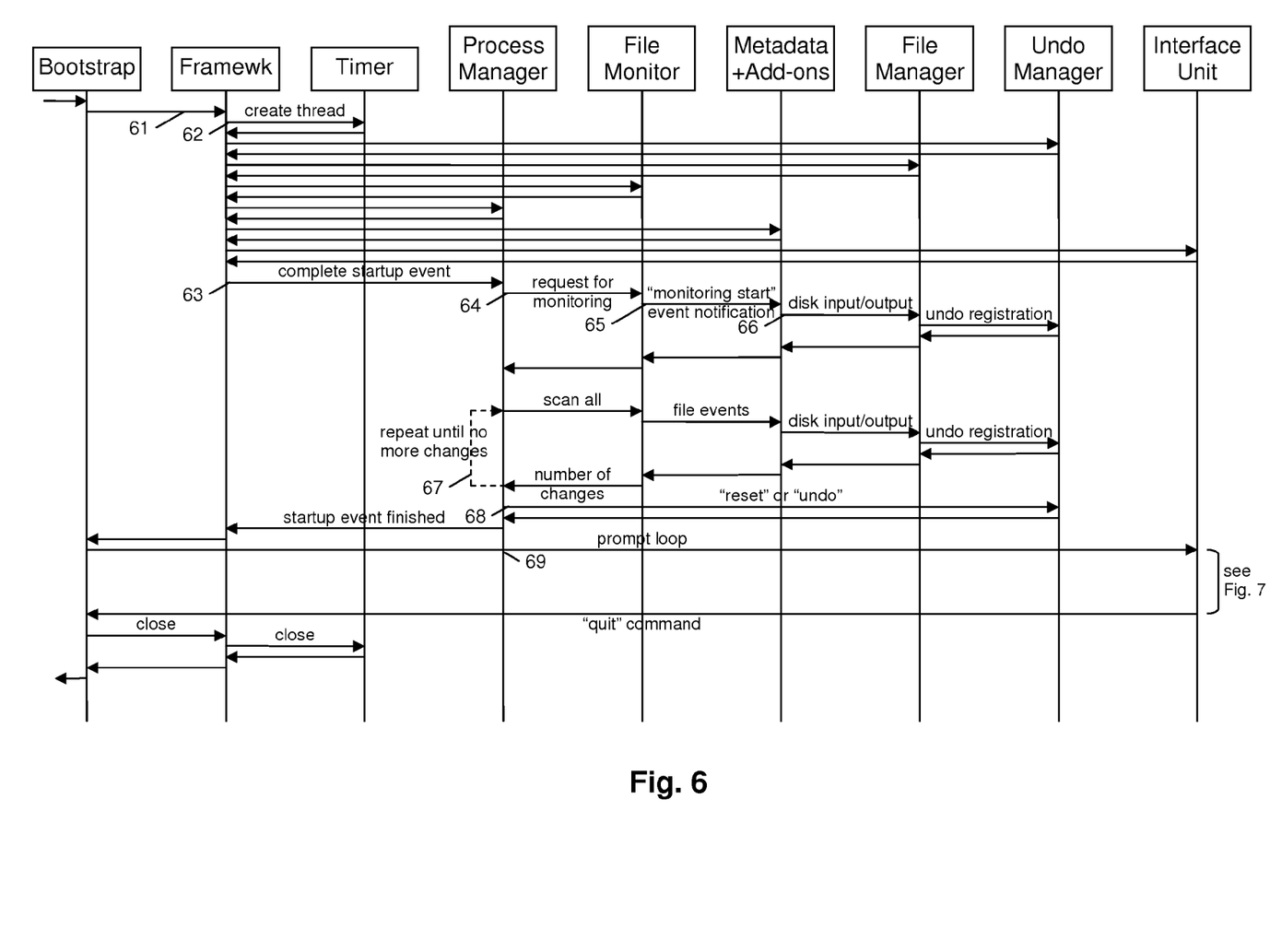
FIG. 6 is a sequence diagram illustrating a startup process in the code generator.

FIG. 6 is a sequence diagram showing a startup process of the code generator 300 in more detail.

At step 61, the bootstrap unit 350 starts and connects the other units when the code generator 300 is first started in the runtime environment 103 on the computer system 100 (see also FIGS. 2, 3 and 4). Conveniently, the bootstrap unit 350 uses the Spring Framework 400 to automatically instantiate the required objects (i.e. the units and modules) and wire together their dependencies. At this construction time, the objects in the code generator 300 do not perform any significant work other than registering to receive events from other objects. Here, each observed object (known as a subject) maintains a list of objects (listeners) which are observing the subject and will notify those listeners, such as by calling a method in the listener, when a state of the subject changes.

At step 62, when all the objects have been instantiated and the listeners connected, an inversion of control container within the Spring Framework 400 establishes the polling thread 352. This polling thread 352 invokes a "background poll" method on the process manager unit 360 at a defined interval, which in the example embodiment is about every 1000 milliseconds.

At step 63, the inversion of control container in the Spring Framework 400 invokes a "complete startup" method on a process manager unit 360. This notifies the process manager unit 360 that it should complete the startup operations with a "complete startup" method. This method is automatically invoked by the Spring Framework 400 when it has finished instantiating all classes and thereby ensuring the complete registration of all listeners.

After the relatively brief startup cycle performed by the inversion of control container 400, operations within the code generator 300 are then directed via the process manager unit 360, in combination with the one or more add-on units 330 that are active in this execution of the code generator 300.

At step 64, the process manager 360 requests the file monitor module 312 to monitor the current working directory 251 where the code generator 300 was started. At this stage, the file monitor module 312 monitors only the current directory without inspecting any sub-directories, so as to minimise the initial delay of the code generator 300 before processing of user commands can begin.

At step 65, the file monitor unit 312 sends "monitoring start" event notifications 315, e.g. in relation to each source code file 201-204 found in the working directory 251, to indicate that monitoring has started.

At step 66, the add-on units 330 generate the metadata items 323 relating to those files 201-204 which are identified in the monitoring start event notifications 315. Typically this stage involves reading the files, parsing the content of the files, and thus creating the metadata key, metadata section and metadata dependency fields for each metadata item 323. These read operations are suitably managed by the file manager module 314. Here, the metadata model 321 is suitably held in the memory of the computer system 100.

One or more of the add-on units 330 may determine to make changes to the file storage unit 251 in response to this inspection of the files 201-204 in the startup phase. In which case, the changes are written to the file storage unit 250 through the file manager module 314 and recorded by the file undo module 316.

At step 67, this inspection process is repeated until no further changes to the file storage unit 250 are detected by the file monitor module 312. That is, the file monitor unit 312 detects that the file storage unit 250 is in a constant state over one or more inspections. For example, the file monitor unit 312 maintains a count of the number of changes detected in each inspection and process manager unit 360 automatically repeats the inspection and event notification processes until the detected number of changes is zero.

At step 68, the file undo module 316 performs an "undo" process to undo the changes to the file storage unit 250 if there is an error or an uncaught exception. Alternately, a "reset" operation is invoked on the undo module 316 should there have been no such errors or uncaught exceptions. The reset operation ensures that resources consumed in implementing the undo process (such as storing backup files and the like) are now released by the file undo module 316.

At step 69, the bootstrap unit 350 is notified that this startup process is now finished, and the bootstrap unit invokes the shell module 342 in the user interface unit 340 to look for user commands.

Figure 7:
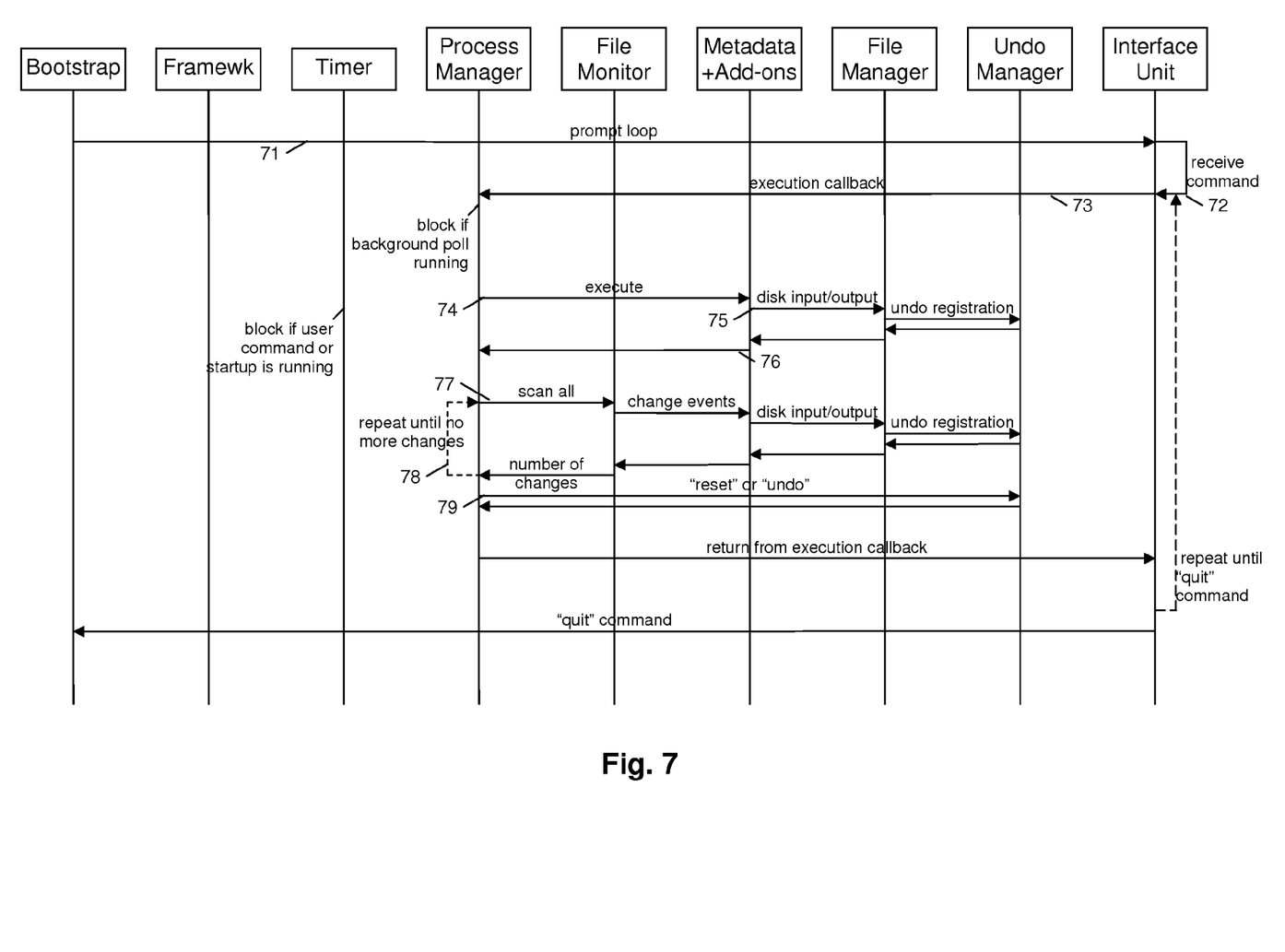
FIG. 7 is a sequence diagram illustrating a operating process in the code generator.

FIG. 7 is a sequence diagram showing an operating process of the code generator 300 in more detail relating to user commands.

At step 71, the bootstrap unit 350 invokes the prompt loop in the user interface unit 340.

At step 72, a user command is received via the user interface unit 340.

At step 73, the process manager 360 receives an execution callback from the user interface unit 340.

At step 74, the process manager unit 360 controls operations in the code generator as a logical unit of work. In this case, a single logical unit of work commences with a "user request" being executed by the process manager unit 360. Alternatively, as will be explained below, the logical unit of work will commence in response to the "background poll". The process manager unit 360 runs a series of commands within the logical unit of work and ensures that those commands complete satisfactorily. Hence, the process manager unit 360 ensures that only one operation at a time will occur.

At step 75, the add-on unit 330 which is associated with the received command operates in response to the command to modify one or more of the source code files 201-204 (e.g. by creating, amending or deleting the source code files) in cooperation with the file manager module 314 and the file undo module 316.

At step 76, the process manager 360 is notified that the commanded changes have been completed.

Therefore, at step 77, the process manager 360 requests the file monitor 312 to scan all of the files in the monitored working directory 251, which initiates further automatic changes to the source code files 201-204 through the file event notifications 315 and the metadata model 321. As discussed above, at step 78, the inspections are repeated until there are no more changes, and the file undo manager 316 is notified to "reset", releasing the resources it consumed to implement the undo facility.

At step 79, the process manager 360 returns from the execution callback to the user interface unit 340, which now accepts the next user command to repeat the process.

In the example embodiment, any exceptions or errors produced during the execution of the command callback are ultimately received by user interface unit 340, which will render these on the screen for user information and then "catch" the exception so that it does not cause the termination of code generator 300. Whilst the process manager unit 360 will detect such exceptions to facilitate operation of the undo module 316, it will ensure those exceptions continue to propagate back through the control flow to the user interface unit 340.

Figure 8:
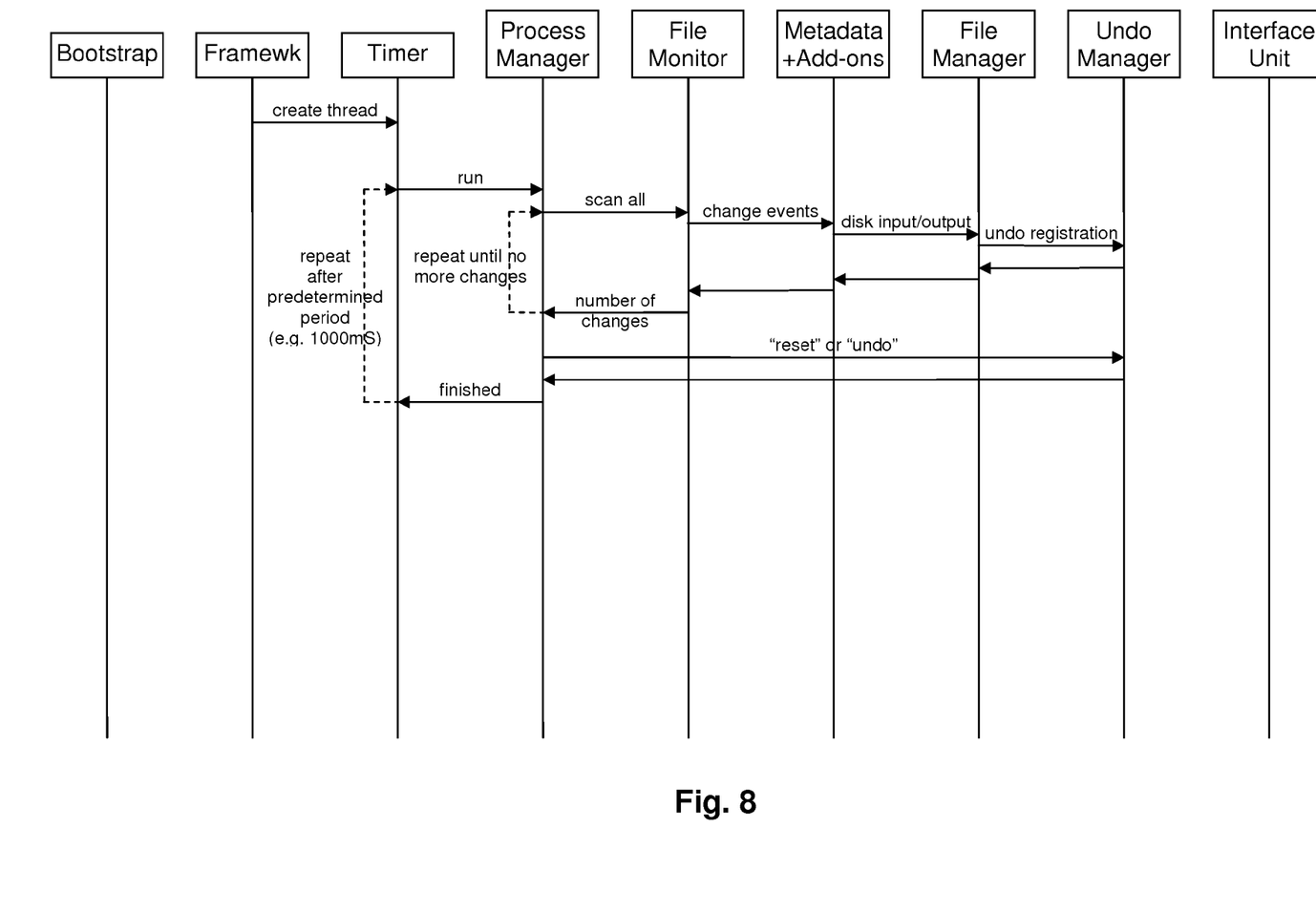
FIG. 8 is a sequence diagram illustrating another operating process in the code generator.

FIG. 8 is a sequence diagram showing a process of the code generator 300 in more detail relating to the background poll.

At step 81, all of the monitored files 201-204 and directories 251 are inspected periodically, such as every 1000 milliseconds.

At step 82, the inspection is immediately repeated if any changes were detected in the last inspection, until there are no more changes.

Whilst the background poll is executing, any user actions requested via the user interface unit 340 will block and wait for the background poll to complete in full. However, if a command from the user interface unit 340 is executing via the process manager unit 360 (as detailed above), any invocation of the background poll thread 352 will immediately return. In other words, the background poll thread 352 will not block and wait for the user interface operation to complete. This ensures that a large number of background thread requests do not queue up if a particularly long-running user interface command is being processed. At an implementation level, the process manager unit 360 provides concurrent (ie unsynchronised) access to its present status, such that the background thread when invoked can make a determination as to whether it should immediately return or formally attempt to acquire a lock on the process manager unit 360 logic unit of work.

As an example, the user command to create a new project is of the form "create project-topLevelPackage [project name]". In response, the relevant add-on unit 330 creates several files and sub-directories on the file storage unit 251. For example, the add-on unit 330 creates the directories /src/main/java/, /src/main/resources, etc., that are required by the project 200. Also, the add-on unit 330 creates initial configuration files such as pom.xml, applicationContext.xml, index.jsp and so on. That is, the code generator 300 automatically creates at least some of the source code files 201-204 that will be needed by the project 200.

Next, the command to create a new .java file is of the format "new java file-name myfile", which causes the relevant add-on unit 330 to create the requested file as an empty Java file called "myfile.java" such as:

```
package myproject;
public class Myfile {
}
```

However, a more complex command such as "new persistent class jpa-name ~.Author" again creates a new file Author.java, but here with annotations that are specific to the code generator 300, such as "@CGToString" in the following example:

```
package myproject;
import org.codegenerator.entity.CGEntity;
import org.codegenerator.javabean.CGJavaBean;
import org.codegenerator.tostring.CGToString;
@CGEntity
@CGJavaBean
@CGToString
public class Author {
}
```

In response to the creation of this new file, the add-on unit 330 also creates one or more aspect oriented source code files 202 such as Author_Cg_Configurable.aj with the content:

```
package myproject;
privileged aspect Author_Cg_Configurable {
  declare         @type:              Author:
  @org.codegenerator.beans.factory.annotation.Configurable;
}
```

Similarly, a file Author_Cg_ToString.aj (i.e. concerning the frequently-used ToString method) is created with the relevant inter-type declared member contained therein:

```
package myproject;
privileged aspect Author_Cg_ToString {
  public java.lang.String Author.toString( ) {
    StringBuilder sb = new StringBuilder( );
    sb.append("id: ").append(getId( )).append(", ");
    sb.append("version: ").append(getVersion( )).append(", ");
    return sb.toString( );
  }
}
```

The computer system described herein includes a code generator 300 that has many advantages, which will be appreciated from the foregoing description. The code generator has an architecture and infrastructure which includes the metadata model, file system abstraction (with undo capabilities), and process management (to provide a simplified programming that side-steps concurrency/threading issues). Thus, additional add-on units are easily developed and added into the code generator.

Although a few preferred embodiments have been shown and described, it will be appreciated by those skilled in the art that various changes and modifications might be made without departing from the scope of the invention, as defined in the appended claims.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more non-transitory computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Many variations, modifications, additions, and improvements are possible, regardless the makeup of the datacenter. The drift visualization can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

The invention claimed is:

1. An apparatus for automatically generating source code files in a file storage unit, the apparatus comprising:
    a processor configured to interact with a memory;
    a file storage unit that stores the source code files; and
    a code generator unit that generates at least some of the source code files, wherein the code generator unit comprises:
        a file unit that monitors the file storage unit to detect changes in the file storage unit and in response send file event notifications;
        a metadata unit that builds a metadata model relating to the source code files in the file storage unit, wherein the metadata model comprises a plurality of metadata items, wherein each metadata item comprises a metadata section containing metadata, a key that identifies the metadata item, and one or more dependencies of the metadata items in relation to other of the metadata items, and wherein the metadata unit sends metadata notifications according to changes to the dependencies of the metadata items; and
        at least one add-on unit comprising a metadata provider module that (i) provides the metadata items to the metadata unit and registers the dependencies of the metadata items on other of the metadata items, (ii) automatically generates one or more of the source code files using the metadata model in response to the file event notifications and the metadata notifications, and (iii) automatically generates at least one of the source code files containing an inter-type declaration that adds an additional member into another of the source code files.

2. The apparatus as recited in claim 1, wherein the metadata provider module automatically generates one or more of the source code files using the metadata model in response to the file event notifications or the metadata notifications.

3. The apparatus as recited in claim 1, wherein the file storage unit includes a directory to store one or more source code files.

4. The apparatus as recited in claim 1, wherein the file unit includes a file monitor module to perform inspections of the file storage unit.

5. The apparatus as recited in claim 4, wherein the file unit includes a file manager module to issues file event notifications in response to detection of changes in the file storage unit by the file monitor unit.

6. The apparatus as recited in claim 1, wherein the file unit includes a file undo module to reverse changes made to files on the file storage unit, should one of the changes cause an exception.

7. The apparatus as recited in claim 1, wherein the metadata unit includes a metadata provider module to provide metadata items for use in a metadata model, wherein the metadata provider module registers dependencies of the metadata items upon other metadata items in the metadata model.

8. The apparatus as recited in claim 7, wherein the metadata unit includes a metadata service module to gather the metadata items from the metadata provider module.

9. The apparatus as recited in claim 8, wherein the metadata unit includes a metadata cache to cache the metadata items that have been gathered by the metadata service module.

10. A method of automatically generating source code files in a file storage unit, the method comprising:
    monitoring the file storage unit to detect changes in the file storage unit and in response send file event notifications;
    building a metadata model relating to the source code files in the file storage unit, wherein the metadata model comprises a plurality of metadata items, a key that identifies the metadata item, and one or more dependencies of the metadata items in relation to other of the metadata items; and
    automatically generating one or more of the source code files using the metadata model in response to a notification, including automatically generating at least one of the source code files containing an inter-type declaration that adds an additional member into another of the source code files.

11. The method as recited in claim 10, wherein each metadata item comprises a metadata section containing metadata.

12. The method as recited in claim 10, wherein the metadata unit sends metadata notifications according to changes to the dependencies of the metadata items.

13. The method as recited in claim 10, wherein the notification is one of the file event notifications.

14. The method as recited in claim 10, wherein the notification is one of metadata notifications.

15. The method as recited in claim 10, wherein the notification includes both one of one of the file event notifications and one of metadata notifications.

16. A non-transitory computer readable media for storing programming instructions for automatically generating source code files in a file storage unit, the computer readable media comprising:
    programming instructions for monitoring the file storage unit to detect changes in the file storage unit and in response send file event notifications;
    programming instructions for building a metadata model relating to the source code files in the file storage unit, wherein the metadata model comprises a plurality of metadata items, a key that identifies the metadata item, and one or more dependencies of the metadata items in relation to other of the metadata items; and
    programming instructions for automatically generating one or more of the source code files using the metadata model in response to at least one of the file event notifications and the metadata notifications, including automatically generating at least one of the source code files containing an inter-type declaration that adds an additional member into another of the source code files.

17. The computer readable media as recited in claim 16, wherein each metadata item comprises a metadata section containing metadata.

18. The computer readable media as recited in claim 16, wherein the metadata unit including programming instructions for sending metadata notifications according to changes to the dependencies of the metadata items.

* * * * *